United States Patent
Cheng et al.

(10) Patent No.: US 8,948,069 B2
(45) Date of Patent: Feb. 3, 2015

(54) METHODS AND SYSTEMS FOR IMPROVING RESPONSE MESSAGE TRANSMISSION RELIABILITY

(75) Inventors: Steven Cheng, San Diego, CA (US); Guangming Carl Shi, San Diego, CA (US); Tom Chin, San Diego, CA (US); Isaac Ta-yan Siu, San Diego, CA (US); Kuo-Chun Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 786 days.

(21) Appl. No.: 12/351,800

(22) Filed: Jan. 9, 2009

(65) Prior Publication Data

US 2010/0177682 A1 Jul. 15, 2010

(51) Int. Cl.
*G08C 17/00* (2006.01)
*G08C 25/02* (2006.01)
*H04L 1/18* (2006.01)
*H04L 1/00* (2006.01)

(52) U.S. Cl.
CPC ............ *H04L 1/1812* (2013.01); *Y02B 60/34* (2013.01); *H04L 1/1825* (2013.01); *H04L 1/0004* (2013.01); *H04L 1/001* (2013.01); *H04L 1/1893* (2013.01); *Y02B 60/31* (2013.01)
USPC .................. 370/311; 455/343.2; 714/748

(58) Field of Classification Search
USPC ......... 370/230, 235, 252, 310, 328, 341, 363, 370/395, 311; 375/225; 455/522, 455/343.2–343.4, 435.1; 714/749, 776, 748
See application file for complete search history.

(56) References Cited

U.S. PATENT DOCUMENTS

| | | | |
|---|---|---|---|
| 8,090,857 B2 | 1/2012 | Yonge, III | |
| 2002/0032030 A1 | 3/2002 | Berglund et al. | |
| 2003/0039218 A1* | 2/2003 | Kwak | 370/320 |
| 2007/0189320 A1* | 8/2007 | Wu et al. | 370/437 |
| 2008/0117878 A1* | 5/2008 | Kim et al. | 370/331 |
| 2008/0159192 A1* | 7/2008 | Lee et al. | 370/310 |
| 2009/0070650 A1* | 3/2009 | Bourlas et al. | 714/748 |
| 2009/0077430 A1* | 3/2009 | Cho et al. | 714/701 |
| 2009/0086657 A1* | 4/2009 | Alpert et al. | 370/310 |
| 2010/0080176 A1* | 4/2010 | Maas et al. | 370/329 |
| 2010/0124194 A1* | 5/2010 | Chun et al. | 370/329 |
| 2011/0032900 A1* | 2/2011 | Maheshwari et al. | 370/329 |
| 2011/0051599 A1 | 3/2011 | Tanigawa et al. | |
| 2013/0051330 A1* | 2/2013 | Le et al. | 370/329 |

FOREIGN PATENT DOCUMENTS

| | | | |
|---|---|---|---|
| JP | 2003264563 A | 9/2003 | |
| JP | 2004048539 A | 2/2004 | |
| JP | 2004350106 A | 12/2004 | |

(Continued)

OTHER PUBLICATIONS

International Search Report and Written Opinion—PCT/US2010/020533—ISA/EPO—May 4, 2010.

(Continued)

*Primary Examiner* — Habte Mered
(74) *Attorney, Agent, or Firm* — Tyler J. Overall

(57) ABSTRACT

Certain embodiments of the present disclosure improve a robustness of some critical MAC management response massages transmitted from a base station (BS) to a mobile station (MS). In this way, a reliability of transmission can be increased and a messaging failure that results in out of sync state between the MS and the BS can be avoided.

56 Claims, 8 Drawing Sheets

(56) References Cited

FOREIGN PATENT DOCUMENTS

| | | | |
|---|---|---|---|
| JP | 2005538642 A | 12/2005 |
| JP | 2006013559 A | 1/2006 |
| JP | 2006148823 A | 6/2006 |
| JP | 2007028638 A | 2/2007 |
| JP | 2007511975 A | 5/2007 |
| JP | 2007525925 A | 9/2007 |
| JP | 2008502238 A | 1/2008 |
| JP | 2008067171 A | 3/2008 |
| JP | 2008526094 A | 7/2008 |
| JP | 2008527839 A | 7/2008 |
| WO | 2004025870 A1 | 3/2004 |
| WO | 2005050875 A1 | 6/2005 |
| WO | WO-2005086380 A1 | 9/2005 |
| WO | WO-2005122497 A1 | 12/2005 |
| WO | 2006075870 A1 | 7/2006 |
| WO | WO-2006078145 A1 | 7/2006 |

OTHER PUBLICATIONS

Chen Y S et al., "Reliable Transmission for Critical MAC Management Messages", IEEE C802.16m-08/141, Mar. 2008, URL,http://www.ieee802.org/16/tgm/contrib/C80216m-08_141r1.doc.

Taiwan Search Report—TW099100414—TIPO—Apr. 24, 2012.

\* cited by examiner

US 8,948,069 B2

METHODS AND SYSTEMS FOR IMPROVING RESPONSE MESSAGE TRANSMISSION RELIABILITY

TECHNICAL FIELD

Certain embodiments of the present disclosure generally relate to a wireless communication and, more particularly, to a method to improve a transmission reliability of the response messages transmitted from a base station to a mobile station.

SUMMARY

Certain embodiments of the present disclosure provide a method for a wireless communication system. The method generally includes receiving a media access control (MAC) management message from a mobile station, and transmitting a response to the MAC management message in a first data burst using a first modulation and coding scheme (MCS) that is more robust than a second MCS used to transmit a second data burst.

Certain embodiments of the present disclosure provide a method for a wireless communication system. The method generally includes receiving a media access control (MAC) management message from a mobile station, and transmitting a response to the MAC management message in a first data burst using a first modulation and coding scheme (MCS) that is more robust than a second MCS used to transmit a second data burst, and wherein the level of robustness of the first data burst is set to achieve a predefined target error rate at a value lower than a value of a reported carrier-to-interference-plus-noise ratio (CINR).

Certain embodiments of the present disclosure provide a method for a wireless communication system. The method generally includes receiving a media access control (MAC) management message from a mobile station, transmitting a response to the MAC management message in a first data burst using a first modulation and coding scheme (MCS) that is more robust than a second MCS used to transmit a second data burst, increasing a level of robustness of the first data burst used for a retransmission of the response to the MAC management message compare to a previous transmission, if the response to the MAC management message is not successfully received at a mobile station during the previous transmission, and retransmitting the response to the MAC management message until the response to the MAC management message is successfully received at the mobile station.

Certain embodiments of the present disclosure provide an apparatus for a wireless communication system. The apparatus generally includes logic for receiving a media access control (MAC) management message from a mobile station, and logic for transmitting a response to the MAC management message in a first data burst using a first modulation and coding scheme (MCS) that is more robust than a second MCS used to transmit a second data burst.

Certain embodiments of the present disclosure provide an apparatus for a wireless communication system. The apparatus generally includes logic for receiving a media access control (MAC) management message from a mobile station, and logic for transmitting a response to the MAC management message in a first data burst using a first modulation and coding scheme (MCS) that is more robust than a second MCS used to transmit a second data burst, and wherein the level of robustness of the first data burst is set to achieve a predefined target error rate at a value lower than a value of a reported carrier-to-interference-plus-noise ratio (CINR).

Certain embodiments of the present disclosure provide an apparatus for a wireless communication system. The apparatus generally includes logic for receiving a media access control (MAC) management message from a mobile station, logic for transmitting a response to the MAC management message in a first data burst using a first modulation and coding scheme (MCS) that is more robust than a second MCS used to transmit a second data burst, logic for increasing a level of robustness of the first data burst used for a retransmission of the response to the MAC management message compare to a previous transmission, if the response to the MAC management message is not successfully received at a mobile station during the previous transmission, and logic for retransmitting the response to the MAC management message until the response to the MAC management message is successfully received at the mobile station.

Certain embodiments of the present disclosure provide an apparatus for a wireless communication system. The apparatus generally includes means for receiving a media access control (MAC) management message from a mobile station, and means for transmitting a response to the MAC management message in a first data burst using a first modulation and coding scheme (MCS) that is more robust than a second MCS used to transmit a second data burst.

Certain embodiments of the present disclosure provide an apparatus for a wireless communication system. The apparatus generally includes means for receiving a media access control (MAC) management message from a mobile station, and means for transmitting a response to the MAC management message in a first data burst using a first modulation and coding scheme (MCS) that is more robust than a second MCS used to transmit a second data burst, and wherein the level of robustness of the first data burst is set to achieve a predefined target error rate at a value lower than a value of a reported carrier-to-interference-plus-noise ratio (CINR).

Certain embodiments of the present disclosure provide an apparatus for a wireless communication system. The apparatus generally includes means for receiving a media access control (MAC) management message from a mobile station, means for transmitting a response to the MAC management message in a first data burst using a first modulation and coding scheme (MCS) that is more robust than a second MCS used to transmit a second data burst, means for increasing a level of robustness of the first data burst used for a retransmission of the response to the MAC management message compare to a previous transmission, if the response to the MAC management message is not successfully received at a mobile station during the previous transmission, and means for retransmitting the response to the MAC management message until the response to the MAC management message is successfully received at the mobile station.

Certain embodiments of the present disclosure provide a computer-program product for a wireless communication system, comprising a computer readable medium having instructions stored thereon, the instructions being executable by one or more processors. The instructions generally include instructions for receiving a media access control (MAC) management message from a mobile station, and instructions for transmitting a response to the MAC management message in a first data burst using a first modulation and coding scheme (MCS) that is more robust than a second MCS used to transmit a second data burst.

Certain embodiments of the present disclosure provide a computer-program product for a wireless communication system, comprising a computer readable medium having instructions stored thereon, the instructions being executable by one or more processors. The instructions generally include instructions for receiving a media access control (MAC) management message from a mobile station, and instructions for transmitting a response to the MAC management message in a first data burst using a first modulation and coding scheme (MCS) that is more robust than a second MCS used to transmit a second data burst, and wherein the level of robustness of the first data burst is set to achieve a predefined target error rate at a value lower than a value of a reported carrier-to-interference-plus-noise ratio (CINR).

Certain embodiments of the present disclosure provide a computer-program product for a wireless communication system, comprising a computer readable medium having instructions stored thereon, the instructions being executable by one or more processors. The instructions generally include instructions for receiving a media access control (MAC) management message from a mobile station, instructions for transmitting a response to the MAC management message in a first data burst using a first modulation and coding scheme (MCS) that is more robust than a second MCS used to transmit a second data burst, instructions for increasing a level of robustness of the first data burst used for a retransmission of the response to the MAC management message compare to a previous transmission, if the response to the MAC management message is not successfully received at a mobile station during the previous transmission, and instructions for retransmitting the response to the MAC management message until the response to the MAC management message is successfully received at the mobile station.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
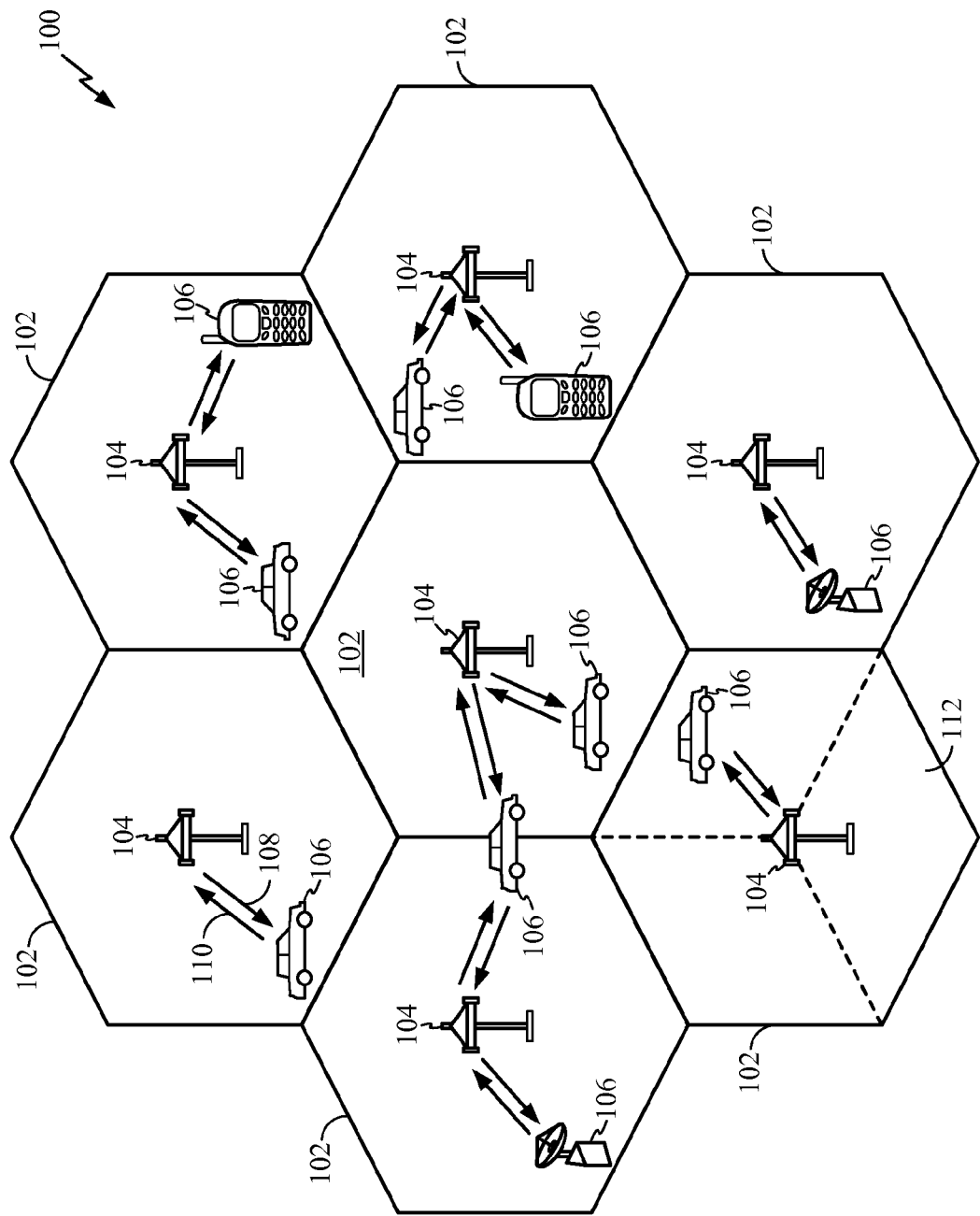
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Worldwide Interoperability for Microwave Access (WiMAX) standards define Media Access Control (MAC) management messages for hand-shaking between a mobile station (MS) and a base station (BS). MAC management messages that are transmitted from the serving BS to the MS in a traffic mode often demand a high reliability of transmission. Examples of MAC management messages of a response type transmitted from the BS to the MS comprise a Mobile Sleep Response (MOB_SLP-RSP) message, a Mobile Scanning Response (MOB_SCN-RSP) message, a Mobile De-Registration Command (MOB_DREG-CMD) message, etc.

When the BS sends a MAC management response message and the MS does not receive it, then operational modes of the MS and the BS may become out of sync. This may result in a loss of throughput loss or even in a call drop.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at lest four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
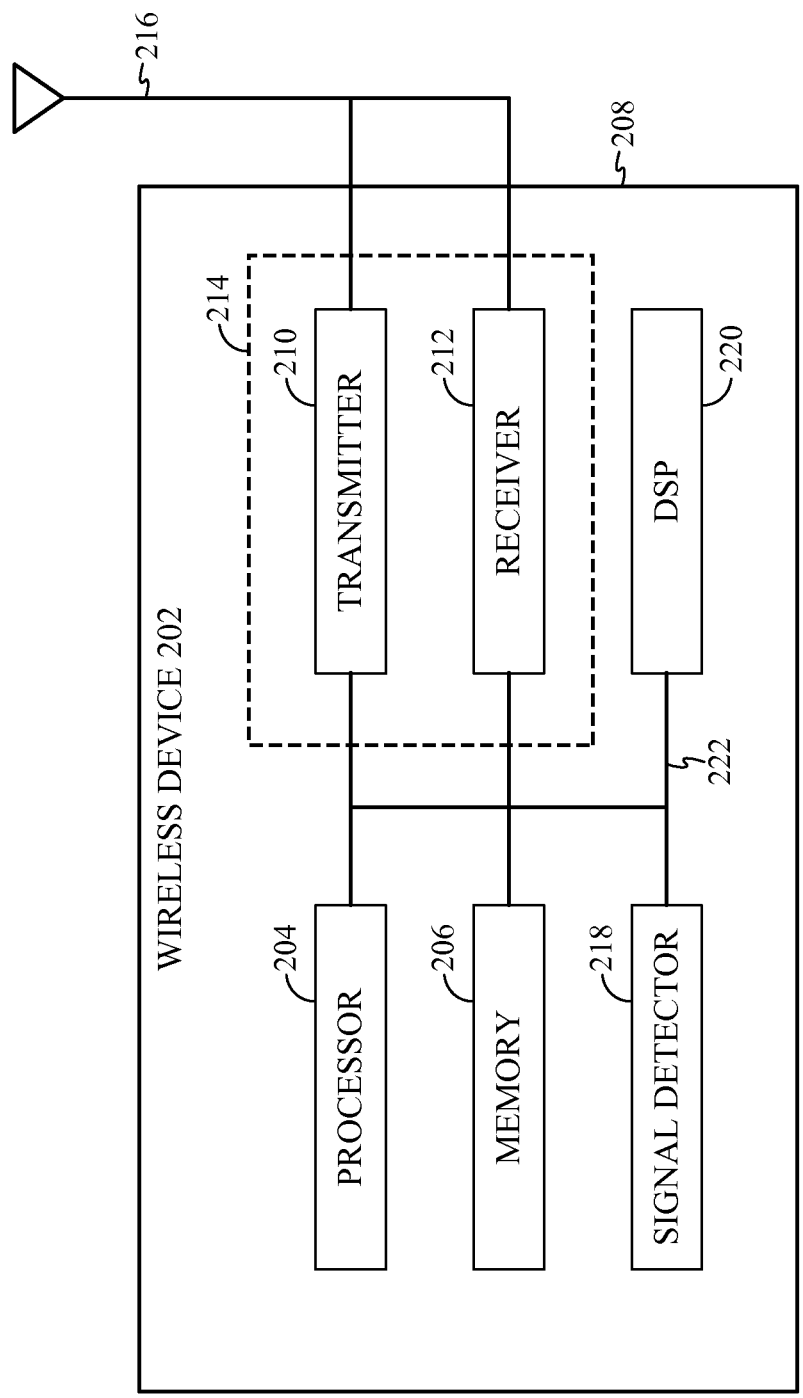
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
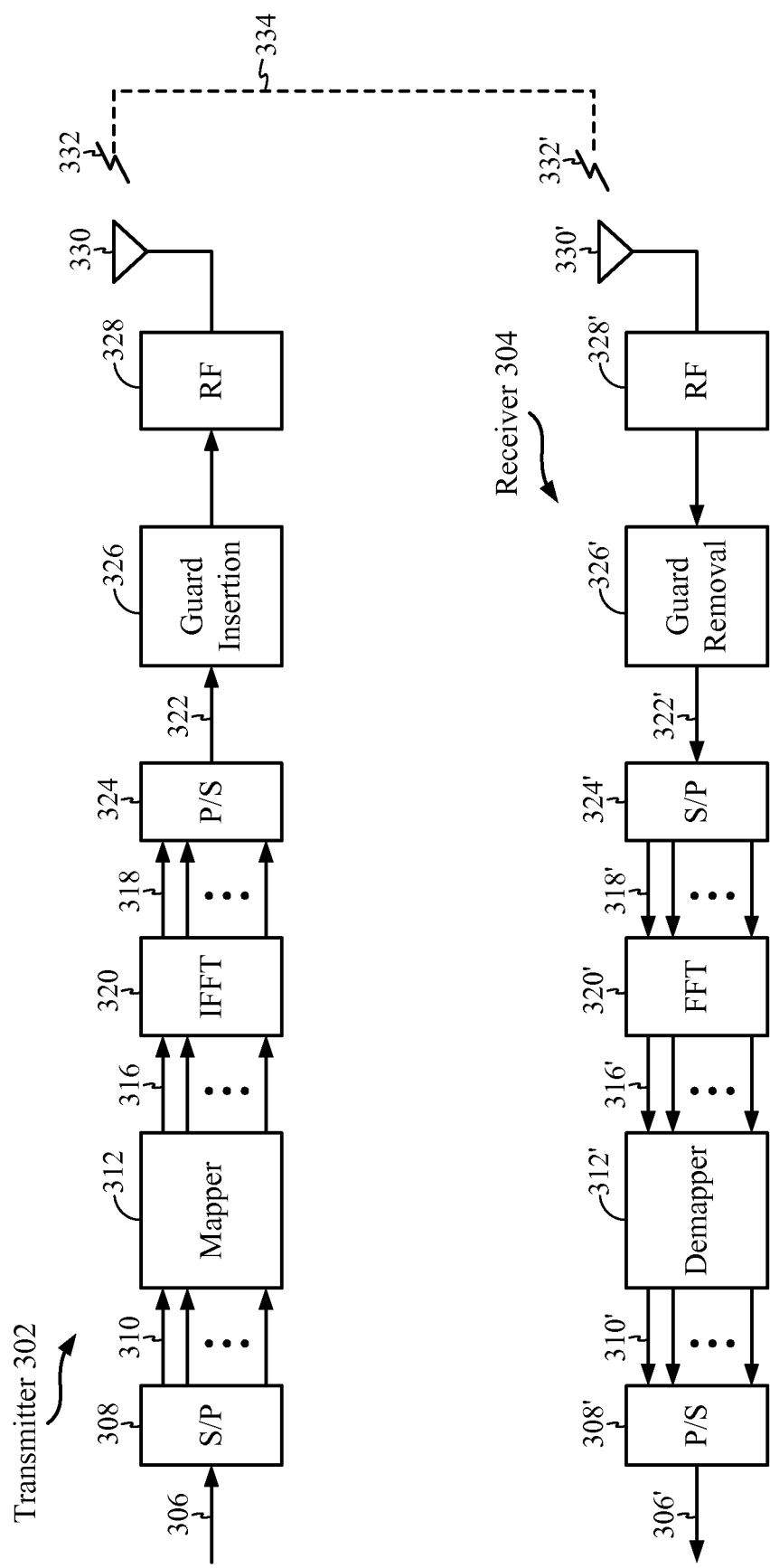
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, Ns, is equal to Ncp (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Contolling Messages Transmission Reliability Improvement

WiMAX standards define Media Access Control (MAC) management messages that can be exchanged between a mobile station (MS) and a base station (BS). There are two general scenarios of exchanging MAC management messages between the MS and the BS: an MS-initiated scenario and a BS-initiated scenario. Certain embodiments of the present disclosure may apply to the MS-initiated scenario, where the MS may first send the MAC management message of a request type, and the BS may then transmit the MAC management message of a response type.

Certain MAC management response messages, such as a MOB_SLP-RSP message, a MOB_SCN-RSP message, and a MOB_DREG-CMD message, can influence an operational state of the MS. Therefore, these control messages typically demand high transmission reliability. If the MS cannot successfully receive the MAC management response message from the BS, then an operational mode of the MS and an operational mode of the BS may not be synchronized. This may result in a loss of throughput or even in a call drop.

Figure 4:
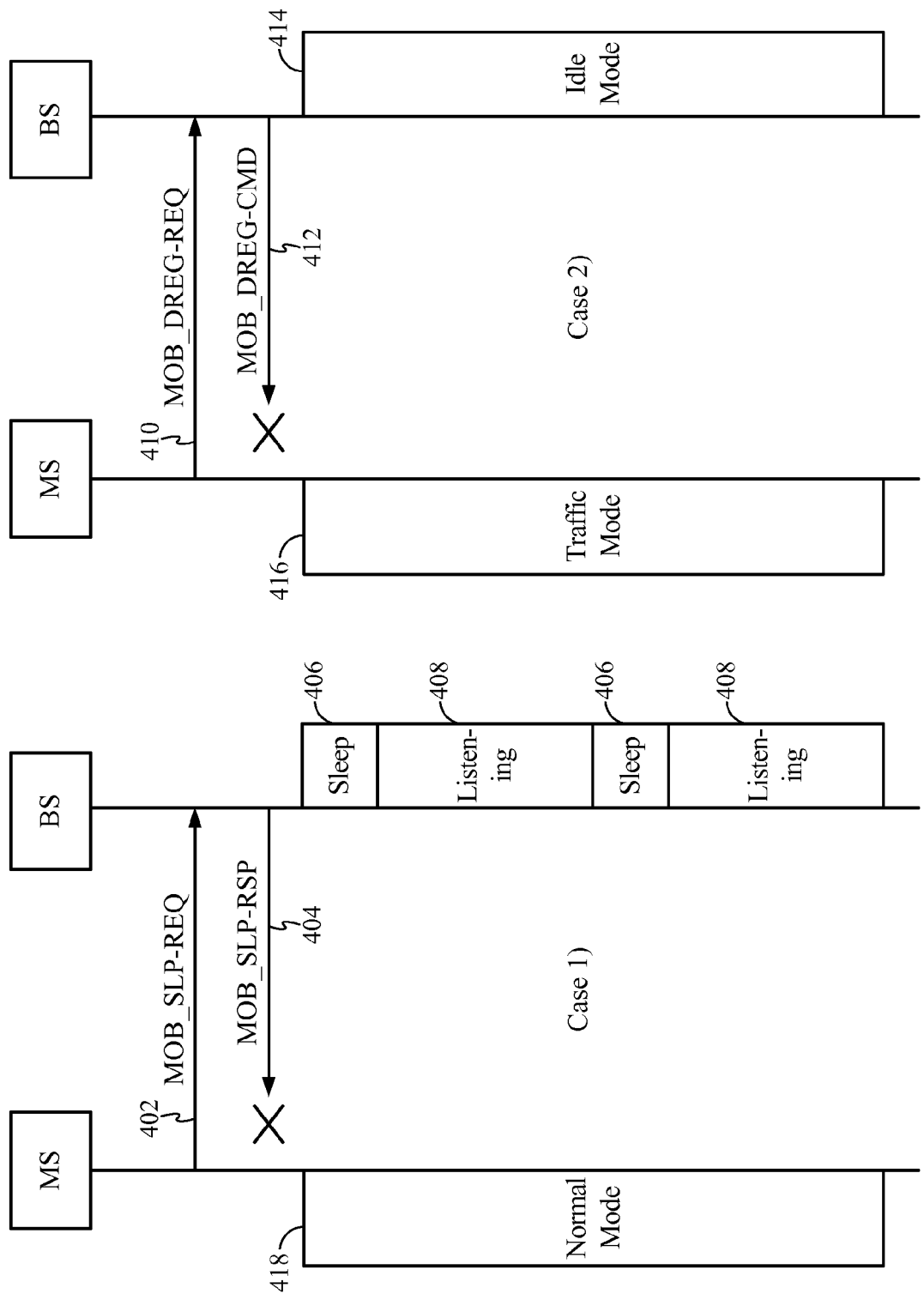
FIG. 4 illustrates examples of unsuccessful transmission of controlling messages from a base station (BS) to a mobile station (MS) in accordance with certain embodiments of the present disclosure.

FIG. 4 illustrates two examples of unsuccessful transmission of MAC management response messages from the BS side to the MS side. In one example, the MS may initiate exchanging of MAC management messages by sending a Mobile Sleep Request (MOB_SLP-REQ) message 402 to the BS asking to enter a sleep mode. After receiving the MOB_SLP-REQ message 402, the BS may respond with the MOB_SLP-RSP message 404. However, the MS may not receive the MOB_SLP-RSP message, as illustrated in FIG. 4, and the MS may be still in the normal mode 418. But, the BS may assume that a sleep schedule is already started at the MS side. Consequently, the BS may not schedule any data transmission to the MS during the expected sleep interval 406, and the throughput can be substantially reduced because data may be transmitted only over listening intervals 408.

In another example, the MS may initiate exchanging of MAC management messages by transmitting a Mobile De-Registration Request (MOB_DREG-REQ) message 410 to the serving BS asking to enter an idle mode. After receiving the MOB_DREG-REQ message 410, the BS may respond with the MOB_DREG-CMD message 412. However, the MS may not receive the MOB_DREG-CMD message 412, as illustrated in FIG. 4, and the MS may still be in the traffic mode 416. But, the BS may assume that the MS is in the idle mode 414. Because of that, although the MS is in the traffic mode, the BS may release a current context of the MS including all connections. Consequently, the call may be dropped.

In order to avoid such problems, certain embodiments of the present disclosure propose several methods to enhance robustness of transmitting MAC management response messages from the BS to the MS, while still considering a possible bandwidth overhead. By applying techniques proposed herein, a probability of successful reception of the MAC management response messages at the MS side is increased.

For certain embodiments of the present disclosure, the BS may utilize more robust modulation and coding scheme for transmitting MAC management response messages than for the regular data bursts, while no information about MS's Carrier-to-interference-plus-noise ratio (CINR) is available at the BS side. For example, the same modulation and coding scheme (MCS) may be utilized to transmit a data burst containing the MAC management response message and for broadcasting a DL-MAP message. In order to limit bandwidth overhead and to allow sending other traffic data with less robust modulation and coding schemes, according to certain embodiments, a limited number of MAC management response messages may be transmitted with substantially more robust burst profile.

For certain embodiments of the present disclosure, the BS may utilize more robust MCS for transmitting the MAC management response message than for the regular data burst, while the reported CINR value from the MS side may be known at the BS side. The utilized level of robustness may be higher than the lowest level of robustness that is sufficient to achieve a predefined error rate at the MS side for an MS-reported CINR value known at the BS. Therefore, the MCS used for sending the data burst of the MAC management response message may need to be sufficiently robust to meet the predefined target error rate at the MS side for the CINR value given by:

$$CINR_{target} = CINR_{reported} - U, \qquad (1)$$

where $CINR_{reported}$ is the MS-reported CINR value known at the BS side, $U$ is a back-off value, and $CINR_{target}$ may be represented in absolute scale or in dB (decibel) units.

Figure 5:
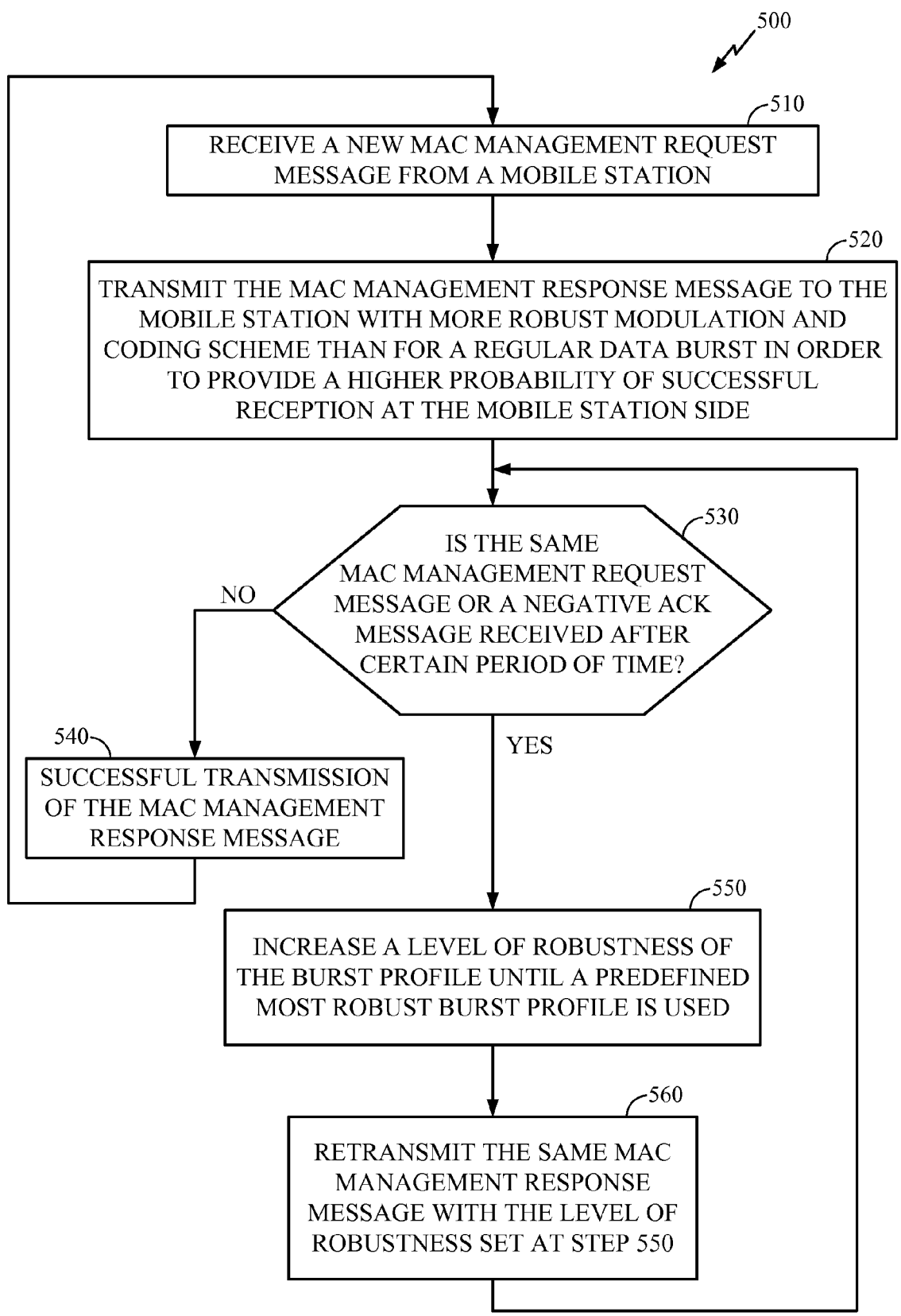
FIG. 5 illustrates example operations for improving a transmission reliability of controlling messages in accordance with certain embodiments of the present disclosure.

FIG. 5 illustrates example operations 500 for improving transmission reliability of control messages for certain embodiments of the present disclosure, where the same MAC management response message may be transmitted a plurality of times with increased robustness of the burst profile until the retransmission is eventually successful. Operations 500 may be performed, for example, by a BS.

At 510, the BS may receive a new MAC management request message from the MS. At 520, the BS may transmit the MAC management response message to the MS with more robust modulation and coding scheme than for the regular data burst in order to provide higher probability of successful reception at the MS side. If, after a certain period of time, the MS does not send to the BS the same MAC management request message or a negative acknowledge message (as determined at 530), then it can be confirmed, at 540, that the transmission of the MAC management response message is successful.

On the other hand, if the MS retransmits the same MAC management request message before the predefined time period expires or the negative acknowledge message (as determined at 530), than the transmission of the MAC management response message is not successful. In this case, at 550, a robustness of the burst profile may be increased compare to the burst profile utilized for the previous transmission of the same MAC management response message. In order to limit the bandwidth overhead of the communication link between the BS side and the MS side, the robustness of the burst profile may be increased until a predefined maximum level of robustness is reached. At 560, the BS may retransmit the same MAC management response message to the MS with the level of robustness of the burst profile that is set at step 550.

Figure 6:
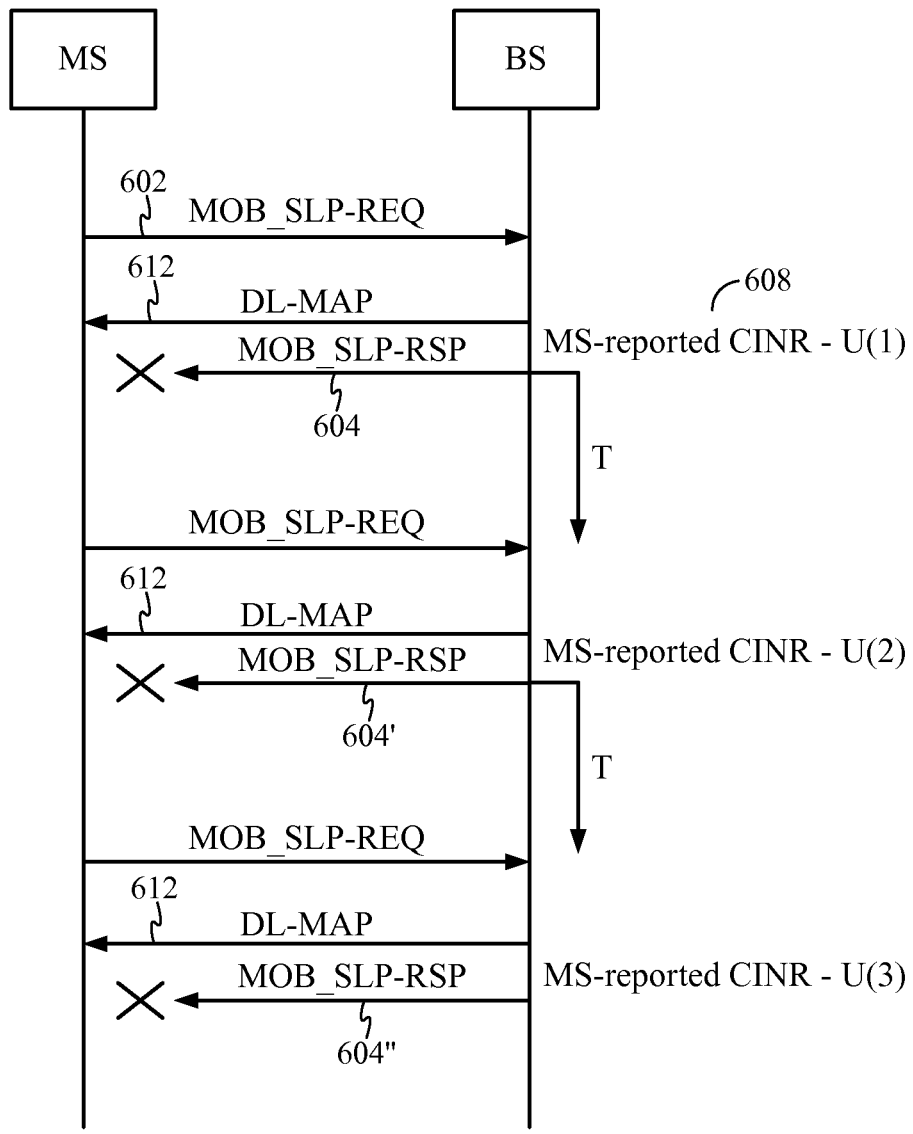
FIG. 6 illustrates an example of signaling between the BS and the MS for the purpose of improving the transmission reliability of controlling messages in accordance with certain embodiments of the present disclosure.

FIG. 6 illustrates one example of signaling between the BS and the MS for improving the transmission reliability of controlling messages where the same MAC management response message may be transmitted a plurality of times with increased robustness of the burst profile until the retransmission is eventually successful. The MS may initiate exchanging of controlling messages with the BS by sending the MAC management request message, such as the MOB_SLP-REQ message 602, as illustrated in FIG. 6. After receiving the MAC management message, the BS may respond with the DL-MAP message 612 and the MAC management response message, such as the MOB_SLP-RSP message 604 for this exemplary case.

The modulation and coding scheme utilized for sending the data burst of the MAC management response message may need to be sufficiently robust to achieve a predefined target error rate at the MS side for the following CINR value:

$$CINR_{target}(i) = CINR_{reported} - U(i), \quad (2)$$

where $CINR_{reported}$ is an MS-reported CINR value 608 from FIG. 6, $U(i)$ is a back-off value for the ith transmission (i=1,2,...) of the same MAC management response message, and $CINR_{target}(i)$ may be represented in absolute scale or in dB units.

Once the BS sends the MAC management response message to the MS, the BS may start a timer T slightly longer than the retransmission timer of the MAC management request message initiated by the MS. If the BS receives the same MAC management request message before the predefined time T expires, then the BS may increase the back-off value defined in equation (2) for the next retransmission of the MOB_SLP-RSP message 604', i.e., $U(i+1) > U(i)$, as illustrated in FIG. 6. Therefore, more robust modulation and coding scheme may be used for retransmitting the MAC management response message to achieve the predefined target error rate at the MS for a lower CINR value than the CINR value used for the ith transmission. The target CINR value for the (i+1)th transmission of the same MAC management response message may be determined as:

$$CINR_{target}(i+1) = CINR_{reported} - U(i+1) \quad (3)$$

The robustness of the modulation and coding scheme utilized for retransmitting the MAC management response messages may be increased (i.e., the MOB_SLP-RSP message 604" is more robust than the MOB_SLP-RSP message 604', as illustrated in FIG. 6) until the predefined most robust burst profile is reached. By limiting the robustness of the burst profile to a maximum predefined level, an overhead of utilized channel bandwidth is upper-bounded.

For certain embodiments of the present disclosure, the robustness of the MAC management response message may be increased from one transmission to another, while the information about CINR at the MS side may not be available at the BS side. Initially, the BS may utilize a modulation and coding scheme for sending a data burst of the MAC management response message with a burst profile b(i). Once the BS sends the MAC management response message to the MS, the BS may start a timer slightly longer than the retransmission timer of the MAC management request message transmitted from the MS. If the BS receives the same MAC management request message before the timer expires, then the BS may use a more robust burst profile b(i+1) than the previously used burst profile b(i). The burst profile for every next retransmission may be more robust compare to the previous burst profile until a predefined most robust burst profile is utilized.

Figure 7:
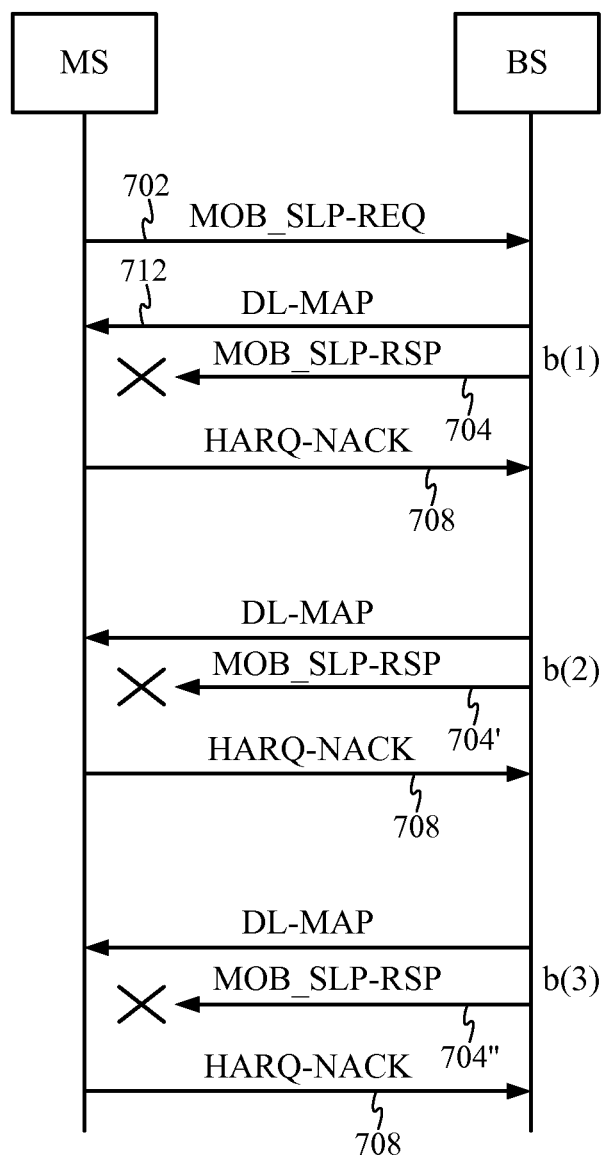
FIG. 7 illustrates another example of signaling between the BS and the MS for the purpose of improving the transmission reliability of controlling messages in accordance with certain embodiments of the present disclosure.

FIG. 7 illustrates another example of signaling between the BS and the MS for improving the transmission reliability of controlling messages where the same MAC management response message may be retransmitted a plurality of times on a Hybrid Automatic Repeat Request (HARQ) channel with increased robustness of the burst profile until the retransmission is eventually successful. The MS may initiate exchanging of control messages with the BS by sending the MAC management request message, such as the MOB_SLP-REQ message 702, as illustrated in FIG. 7.

After receiving the MAC management message, the BS may respond by sending the DL-MAP message 712 and the MAC management response message (such as the MOB_SLP-RSP message 704) on the HARQ channel. The modulation and coding scheme may utilize the burst profile b(i) for sending the data burst of the MAC management response message, as illustrated in FIG. 7. If the BS receives a Hybrid Automatic Repeat Request Negative Acknowledgement (HARQ-NACK) message 708 from the MS, then the transmission is not successful and the BS may retransmit the MAC management response message with more robust burst profile b(i+1) than the previous burst profile b(i), as illustrated in FIG. 7 with the MOB_SLP-RSP message 704'. The robustness of the retransmitted MAC management response message may be further increased (i.e., the MOB_SLP-RSP message 704" is more robust than the MOB_SLP-RSP message 704') until the predefined most robust burst profile is utilized.

Figure 5A:
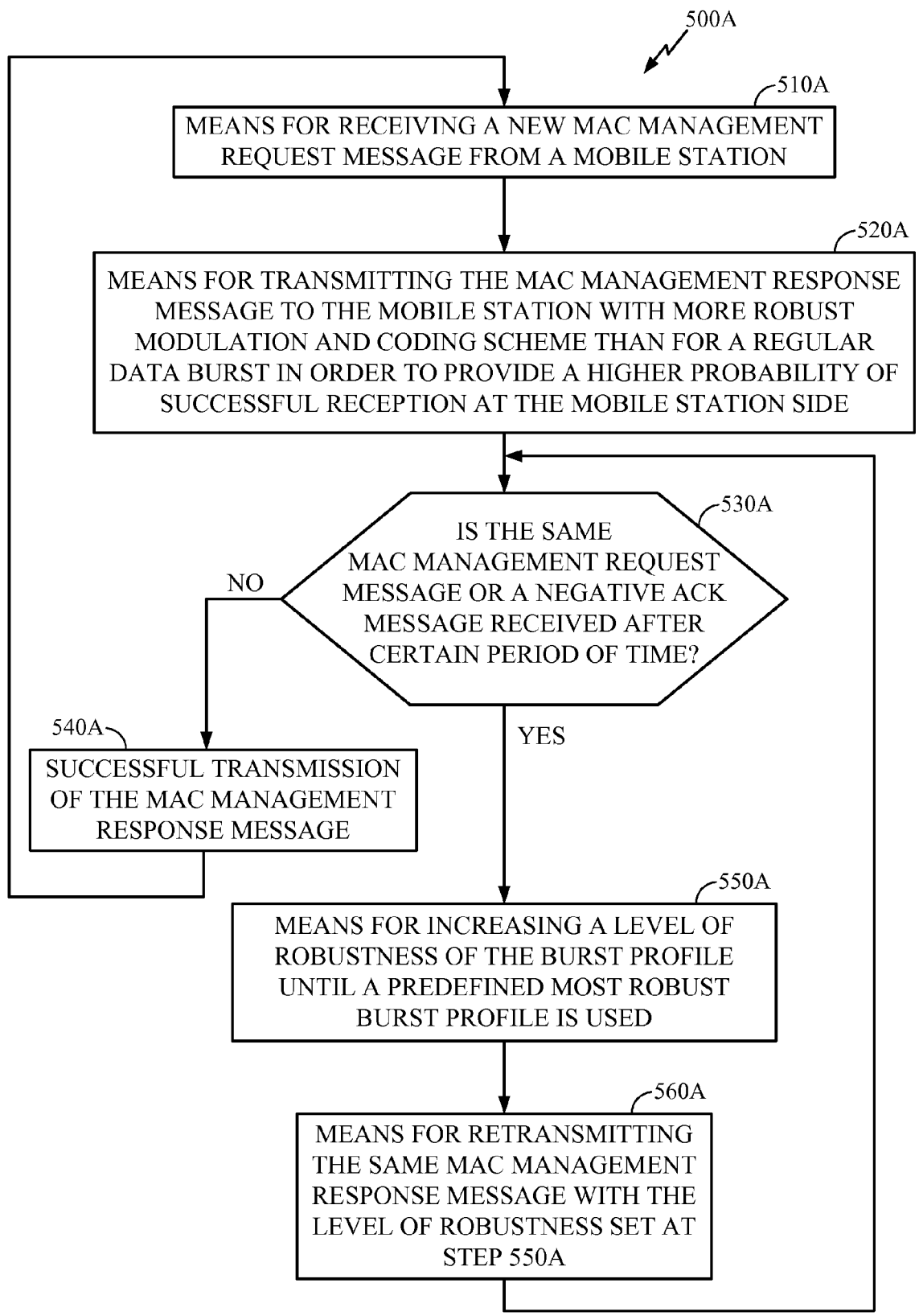
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 510-560 illustrated in FIG. 5 correspond to means-plus-function blocks 510A-560A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for a wireless communication system comprising:
    transmitting a first data burst using a first modulation and coding scheme (MCS);
    receiving a media access control (MAC) management request message from a mobile station; and
    in response to receiving the MAC management request message, transmitting a MAC management response message in a second data burst using a second MCS having a robustness that is independent of carrier-to-interference-plus-noise ratio (CINR) information of the mobile station and that is more robust than the first MCS, wherein the MAC management response message is configured to influence an idle mode, sleep mode, or registration state of the mobile station.

2. The method of claim 1, wherein the second MCS is also used for transmitting a downlink MAP message.

3. The method of claim 1, wherein only one MAC management response message is transmitted in the second data burst using the second MCS.

4. A method for a wireless communication system comprises:
    transmitting a first data burst using a first modulation and coding scheme (MCS);
    receiving a media access control (MAC) management request message from a mobile station;
    in response to receiving the MAC management request message, transmitting a MAC management response message in a second data burst using a second MCS that is at a lower index than the first MCS, wherein the MAC management response message is configured to influence an idle mode, sleep mode, or registration state of the mobile station; and
    wherein a level of robustness of the second MCS achieves a predefined target error rate at a value lower than a value of a reported carrier-to-interference-plus-noise ratio (CINR).

5. A method for a wireless communication system comprises:
    transmitting a first data burst using a first modulation and coding scheme (MCS);
    receiving a media access control (MAC) management request message from a mobile station;
    in response to receiving the MAC management request message, transmitting a MAC management response message in a second data burst using a second MCS that is more robust than the first MCS, wherein the MAC management response message is configured to influence an idle mode, sleep mode, or registration state of the mobile station;
    in response to determining that the MAC management response message is not successfully received at the mobile station in a previous transmission, increasing a level of robustness of a MCS used for a retransmission of the MAC management response message compared to a previous transmission; and
    retransmitting the MAC management response message until the MAC management response message is successfully received at the mobile station.

6. The method of claim 5, wherein the level of robustness of the second MCS is initially set to achieve a predefined error rate at a first value of carrier-to-interference-plus-noise ratio (CINR).

7. The method of claim 6, wherein the level of robustness of the MCS used for a second transmission of the MAC management response message is set to achieve the predefined error rate at a second value of CINR, and wherein the second value of CINR is smaller than the first value of CINR.

8. The method of claim 6, wherein the level of robustness of the MCS used for a kth transmission of the MAC management response message is set to achieve the predefined error rate at a kth value of CINR, and wherein the kth value of CINR is smaller than a (k−1)th value of CINR, and k>2.

9. The method of claim 5, wherein the level of robustness of the MCS used for retransmitting the MAC management response message is increased until a predefined maximal level of robustness is reached.

10. The method of claim 5, wherein the MAC management response message is determined to be unsuccessfully transmitted to the mobile station if another instance of the MAC management request message is received before a predefined time period has elapsed.

11. The method of claim 5, wherein a Hybrid Automatic Repeat Request (HARQ) channel is utilized for transmitting the MAC management response message.

12. The method of claim 11, wherein the MAC management response message is determined to be unsuccessfully transmitted to the mobile station if a Hybrid Automatic Repeat Request Negative Acknowledgement (HARQ-NACK) message is received.

13. The method of claim 12 further comprising:
    transmitting a kth time the MAC management response message on the HARQ channel with a level of robustness larger than a level of robustness used for a (k−1)th transmission, where k>1.

14. The method of claim 13, wherein the level of the robustness used for transmitting the MAC management response message is increased from the (k−1)th transmission to the kth transmission until a predefined maximal level of robustness is reached.

15. An apparatus for a wireless communication system comprising:
    a processor;
    memory in electronic communication with the processor; and
    instructions stored in the memory and executable by the processor to:
        transmit a first data burst using a first modulation and coding scheme (MCS);
        receive a media access control (MAC) management request message from a mobile station; and
        in response to receiving the MAC management request message, transmit a MAC management response message in a second data burst using a second MCS having a robustness that is independent of carrier-to-interference-plus-noise ratio (CINR) information of the mobile station and that is more robust than the first MCS, wherein the MAC management response message is configured to influence an idle mode, sleep mode, or registration state of the mobile station.

16. The apparatus of claim 15, wherein the second MCS is also used for transmitting a downlink MAP message.

17. The apparatus of claim 15, wherein only one MAC management response message is transmitted in the second data burst using the second MCS.

18. An apparatus for a wireless communication system comprising:
    a processor;
    memory in electronic communication with the processor; and
    instructions stored in the memory and executable by the processor to:
        transmit a first data burst using a first modulation and coding scheme (MCS);
        receive a media access control (MAC) management request message from a mobile station;
        in response to receiving the MAC management request message, transmit a MAC management response message in a second data burst using a second MCS that is at a lower index than the first MCS, wherein the MAC management response message is configured to influence an idle mode, sleep mode, or registration state of the mobile station; and
        wherein a level of robustness of the second MCS achieves a predefined target error rate at a value lower than a value of a reported carrier-to-interference-plus-noise ratio (CINR).

19. An apparatus for a wireless communication system comprising:
    a processor;
    memory in electronic communication with the processor; and
    instructions stored in the memory and executable by the processor to:
        transmit a first data burst using a first modulation and coding scheme (MCS);
        receive a media access control (MAC) management request message from a mobile station;
        in response to receiving the MAC management request message, transmit a MAC management response message in a second data burst using a second MCS that is more robust than the first MCS, wherein the MAC management response message is configured to influence an idle mode, sleep mode, or registration state of the mobile station;
        in response to determining that the MAC management response message is not successfully received at the mobile station in a previous transmission, increase a level of robustness of a MCS used for a retransmission of the MAC management response message compared to a previous transmission; and
        retransmit the MAC management response message until the MAC management response message is successfully received at the mobile station.

20. The apparatus of claim 19, wherein the level of robustness of the second MCS is initially set to achieve a predefined error rate at a first value of carrier-to-interference-plus-noise ratio (CINR).

21. The apparatus of claim 20, wherein the level of robustness of the MCS used for a second transmission of the MAC management response message is set to achieve the predefined error rate at a second value of CINR, and wherein the second value of CINR is smaller than the first value of CINR.

22. The apparatus of claim 20, wherein the level of robustness of the MCS used for a kth transmission of the MAC management response message is set to achieve the predefined error rate at a kth value of CINR, and wherein the kth value of CINR is smaller than a (k−1)th value of CINR, and k>2.

23. The apparatus of claim 19, wherein the level of robustness of the MCS used for retransmitting the MAC management response message is increased until a predefined maximal level of robustness is reached.

24. The apparatus of claim 19, wherein the MAC management response message is determined to be unsuccessfully transmitted to the mobile station if another instance of the MAC management request message is received before a predefined time period has elapsed.

25. The apparatus of claim 19, wherein a Hybrid Automatic Repeat Request (HARQ) channel is utilized for transmitting the MAC management response message.

26. The apparatus of claim 25, wherein the MAC management response message is determined to be unsuccessfully transmitted to the mobile station if a Hybrid Automatic Repeat Request Negative Acknowledgement (HARQ-NACK) message is received.

27. The apparatus of claim 26 wherein the instructions are executable by the processor to transmit a kth time the MAC management response message on the HARQ channel with a level of robustness larger than a level of robustness used for a (k−1)th transmission, where k>1.

28. The apparatus of claim 27, wherein the level of the robustness used for transmitting the MAC management response message is increased from the (k−1)th transmission to the kth transmission until a predefined maximal level of robustness is reached.

29. An apparatus for a wireless communication system comprises:
  means for transmitting a first data burst using a first modulation and coding scheme (MCS);
  means for receiving a media access control (MAC) management request message from a mobile station; and
  means for transmitting a MAC management response message in response to receiving the MAC management request message, the MAC management response message transmitted in a second data burst using a second MCS having a robustness that is independent of carrier-to-interference-plus-noise ratio (CINR) information of the mobile station and that is more robust than the first MCS, wherein the MAC management response message is configured to influence an idle mode, sleep mode, or registration state of the mobile station.

30. The apparatus of claim 29, wherein the second MCS is also used for transmitting a downlink MAP message.

31. The apparatus of claim 29, wherein only one MAC management response message is transmitted in the second data burst using the second MCS.

32. An apparatus for a wireless communication system comprises:
  means for transmitting a first data burst using a first modulation and coding scheme (MCS);
  means for receiving a media access control (MAC) management request message from a mobile station;
  means for transmitting a MAC management response message in response to receiving the MAC management request message, the MAC management response message transmitted in a second data burst using a second MCS that is at a lower index than the first MCS, wherein the MAC management response message is configured to influence an idle mode, sleep mode, or registration state of the mobile station; and
  wherein a level of robustness of the second MCS achieves a predefined target error rate at a value lower than a value of a reported carrier-to-interference-plus-noise ratio (CINR).

33. An apparatus for a wireless communication system comprises:
  means for transmitting a first data burst using a first modulation and coding scheme (MCS);
  means for receiving a media access control (MAC) management request message from a mobile station;
  means for transmitting a MAC management response message in response to receiving the MAC management request message, the MAC management response message transmitted in a second data burst using a second MCS that is more robust than the first MCS, wherein the MAC management response message is configured to influence an idle mode, sleep mode, or registration state of the mobile station;
  means for increasing a level of robustness of a MCS used for a retransmission of the MAC management response message compared to a previous transmission, the level of robustness increased in response to determining that the MAC management response message is not successfully received at the mobile station in a previous transmission; and
  means for retransmitting the MAC management response message until the MAC management response message is successfully received at the mobile station.

34. The apparatus of claim 33, wherein the level of robustness of the second MCS is initially set to achieve a predefined error rate at a first value of carrier-to-interference-plus-noise ratio (CINR).

35. The apparatus of claim 34, wherein the level of robustness of the MCS used for a second transmission of the MAC management response message is set to achieve the predefined error rate at a second value of CINR, and wherein the second value of CINR is smaller than the first value of CINR.

36. The apparatus of claim 34, wherein the level of robustness of the MCS used for a kth transmission of the MAC management response message is set to achieve the predefined error rate at a kth value of CINR, and wherein the kth value of CINR is smaller than a (k−1)th value of CINR, and k>2.

37. The apparatus of claim 33, wherein the level of robustness of the MCS used for retransmitting the MAC management response message is increased until a predefined maximal level of robustness is reached.

38. The apparatus of claim 33, wherein the MAC management response message is determined to be unsuccessfully transmitted to the mobile station if another instance of the MAC management request message is received before a predefined time period has elapsed.

39. The apparatus of claim 33, wherein a Hybrid Automatic Repeat Request (HARQ) channel is utilized for transmitting the MAC management response message.

40. The apparatus of claim 39, wherein the MAC management response message is determined to be unsuccessfully transmitted to the mobile station if a Hybrid Automatic Repeat Request Negative Acknowledgement (HARQ-NACK) message is received.

41. The apparatus of claim 40 further comprising:
  means for transmitting a kth time the MAC management response message on the HARQ channel with a level of robustness larger than a level of robustness used for a (k−1)th transmission, where k>1.

42. The apparatus of claim 41, wherein the level of the robustness used for transmitting the MAC management response message is increased from the (k−1)th transmission to the kth transmission until a predefined maximal level of robustness is reached.

43. A computer-program product for a wireless communication system, comprising a non-transitory computer readable medium having instructions stored thereon, the instructions being executable by one or more processors and the instructions comprising:
  instructions for transmitting a first data burst using a first modulation and coding scheme (MCS);
  instructions for receiving a media access control (MAC) management request message from a mobile station; and
  instructions for transmitting a MAC management response message in response to receiving the MAC management request message, the MAC management response message transmitted in a second data burst using a second MCS having a robustness that is independent of carrier-to-interference-plus-noise ratio (CINR) information of the mobile station and that is more robust than the first MCS, wherein the MAC management response message is configured to influence an idle mode, sleep mode, or registration state of the mobile station.

44. The computer-program product of claim 43, wherein the second MCS is also used for transmitting a downlink MAP message.

45. The computer-program product of claim 43, wherein only one MAC management response message is transmitted in the second data burst using the second MCS.

46. A computer-program product for a wireless communication system, comprising a non-transitory computer readable medium having instructions stored thereon, the instructions being executable by one or more processors and the instructions comprising:
- instructions for transmitting a first data burst using a first modulation and coding scheme (MCS);
- instructions for receiving a media access control (MAC) management request message from a mobile station;
- instructions for transmitting a MAC management response message in response to receiving the MAC management request message, the MAC management response message transmitted in a second data burst using a second MCS that is at a lower index than the first MCS, wherein the MAC management response message is configured to influence an idle mode, sleep mode, or registration state of the mobile station; and
- wherein a level of robustness of the second MCS achieves a predefined target error rate at a value lower than a value of a reported carrier-to-interference-plus-noise ratio (CINR).

47. A computer-program product for a wireless communication system, comprising a non-transitory computer readable medium having instructions stored thereon, the instructions being executable by one or more processors and the instructions comprising:
- instructions for transmitting a first data burst using a first modulation and coding scheme (MCS);
- instructions for receiving a media access control (MAC) management request message from a mobile station;
- instructions for transmitting a MAC management response message in response to receiving the MAC management request message, the MAC management response message transmitted in a second data burst using a second MCS that is more robust than the first MCS, wherein the MAC management response message is configured to influence an idle mode, sleep mode, or registration state of the mobile station;
- instructions for increasing a level of robustness of a MCS used for a retransmission of the MAC management response message compared to a previous transmission in response to determining that the MAC management response message is not successfully received at the mobile station in a previous transmission; and
- instructions for retransmitting the MAC management response message until the MAC management response message is successfully received at the mobile station.

48. The computer-program product of claim 47, wherein the level of robustness of the second MCS is initially set to achieve a predefined error rate at a first value of carrier-to-interference-plus-noise ratio (CINR).

49. The computer-program product of claim 48, wherein the level of robustness of the MCS used for the second transmission of the MAC management response message is set to achieve the predefined error rate at a second value of CINR, and wherein the second value of CINR is smaller than the first value of CINR.

50. The computer-program product of claim 48, wherein the level of robustness of the MCS used for a kth transmission of the MAC management response message is set to achieve the predefined error rate at a kth value of CINR, and wherein the kth value of CINR is smaller than the (k−1)th value of CINR, and k>2.

51. The computer-program product of claim 47, wherein the level of robustness of the MCS used for retransmitting the MAC management response message is increased until a predefined maximal level of robustness is reached.

52. The computer-program product of claim 47, wherein the MAC management response message is determined to be unsuccessfully transmitted to the mobile station if another instance of the MAC management request message is received before a predefined time period has elapsed.

53. The computer-program product of claim 47, wherein a Hybrid Automatic Repeat Request (HARQ) channel is utilized for transmitting the MAC management response message.

54. The computer-program product of claim 53, wherein the MAC management response message is determined to be unsuccessfully transmitted to the mobile station if a Hybrid Automatic Repeat Request Negative Acknowledgement (HARQ-NACK) message is received.

55. The computer-program product of claim 54, wherein the instructions further comprise:
- instructions for transmitting a kth time the MAC management response message on the HARQ channel with a level of robustness larger than a level of robustness used for a (k−1)th transmission, where k>1.

56. The computer-program product of claim 55, wherein the level of the robustness used for transmitting the MAC management response message is increased from the (k−1)th transmission to the kth transmission until a predefined maximal level of robustness is reached.

* * * * *